United States Patent
Rust et al.

(10) Patent No.: US 11,938,998 B2
(45) Date of Patent: Mar. 26, 2024

(54) COMBINATION VEHICLE SYSTEM AND/OR METHOD

(71) Applicant: Anamnesis Corporation, San Francisco, CA (US)

(72) Inventors: Ian C. Rust, San Francisco, CA (US); Ding Jin, San Francisco, CA (US); Shaochun Ye, San Francisco, CA (US)

(73) Assignee: Anamnesis Corporation, San Francisco, CA (US)

( * ) Notice: Subject to any disclaimer, the term of this patent is extended or adjusted under 35 U.S.C. 154(b) by 0 days.

(21) Appl. No.: 18/226,702

(22) Filed: Jul. 26, 2023

(65) Prior Publication Data
US 2024/0034405 A1    Feb. 1, 2024

Related U.S. Application Data

(60) Provisional application No. 63/392,332, filed on Jul. 26, 2022.

(51) Int. Cl.
| | | |
|---|---|---|
| *B62D 13/06* | (2006.01) | |
| *B62D 6/00* | (2006.01) | |
| *B62D 15/02* | (2006.01) | |

(52) U.S. Cl.
CPC ............. *B62D 13/06* (2013.01); *B62D 6/003* (2013.01); *B62D 15/023* (2013.01); *B62D 15/025* (2013.01)

(58) Field of Classification Search
CPC ...... B62D 13/06; B62D 6/003; B62D 15/023; B62D 15/025
See application file for complete search history.

(56) References Cited

U.S. PATENT DOCUMENTS

| | | | | |
|---|---|---|---|---|
| 2,153,468 A | * | 4/1939 | Heyn | B62D 53/0864 |
| | | | | 280/476.1 |
| 3,479,055 A | * | 11/1969 | Conlon | B62D 49/005 |
| | | | | 280/421 |

(Continued)

FOREIGN PATENT DOCUMENTS

| | | |
|---|---|---|
| EP | 0053001 A1 | 6/1982 |
| EP | 2634018 A1 | 9/2013 |
| WO | 2020107125 A1 | 6/2020 |

OTHER PUBLICATIONS

Nuttalltrailers, 12 Ton Single Axle Jeep, http://web.archive.org/web/20220403071308/http://nuttalltrailers.com/id114.html, Apr. 2022 (Year: 2022).*

(Continued)

*Primary Examiner* — Sze-Hon Kong
(74) *Attorney, Agent, or Firm* — Jeffrey Schox; Evan Myers

(57) ABSTRACT

A method S100 can include: determining a set of inputs S110; determining a vehicle state estimate S120; determining a vehicle command based on the vehicle state estimate S130; and optionally controlling the vehicle based on the vehicle command S140. However, the method S100 can additionally or alternatively include any other suitable elements. The method S100 functions to facilitate vehicle reversal and/or tractable vehicle control (e.g., during reversal). Additionally or alternatively, the method can function to reduce and/or eliminate unrecoverable vehicle state incidence during vehicle reversal (a.k.a., vehicle backing). Additionally or alternatively, the method can function to autonomously augment and/or assist vehicle control (e.g., during vehicle reversal).

18 Claims, 11 Drawing Sheets

(56) References Cited

U.S. PATENT DOCUMENTS

| | | | | |
|---|---|---|---|---|
| 4,070,033 | A * | 1/1978 | Weir | B62D 53/0864 280/476.1 |
| 4,741,549 | A * | 5/1988 | Gevers | B62D 53/061 280/407.1 |
| 4,762,192 | A * | 8/1988 | Maxwell | B62D 59/04 180/14.2 |
| 4,768,802 | A * | 9/1988 | Winkler | B62D 53/0864 280/81.6 |
| 5,067,741 | A * | 11/1991 | Ayme | B62D 53/061 280/476.1 |
| 5,626,356 | A * | 5/1997 | Harwood | B62D 53/0864 280/441 |
| 5,924,716 | A * | 7/1999 | Burkhart, Sr. | B62D 53/0864 280/476.1 |
| 6,036,217 | A * | 3/2000 | Burkhart, Sr. | B62D 53/067 280/436 |
| 6,152,475 | A | 11/2000 | Poole | |
| 6,257,611 | B1 * | 7/2001 | Muldoon | B62D 13/025 280/446.1 |
| 6,450,523 | B1 * | 9/2002 | Masters | B62D 53/06 280/476.1 |
| 6,796,572 | B1 | 9/2004 | McGhie | |
| 8,317,452 | B2 * | 11/2012 | Lundin | B60G 9/003 280/434 |
| 8,353,521 | B1 * | 1/2013 | Seeley | B62D 53/061 280/417.1 |
| 8,909,426 | B2 | 12/2014 | Rhode et al. | |
| 9,290,202 | B2 | 3/2016 | Lavoie | |
| 11,396,326 | B2 | 7/2022 | Newton et al. | |
| 2007/0090688 | A1 * | 4/2007 | Haemmerling | B62D 13/06 303/7 |
| 2009/0250901 | A1 * | 10/2009 | Lundin | B60P 3/125 280/442 |
| 2014/0015223 | A1 | 1/2014 | Banwart | |
| 2014/0303847 | A1 * | 10/2014 | Lavoie | B62D 15/0275 701/41 |
| 2015/0291179 | A1 * | 10/2015 | Tagesson | B60W 40/105 702/158 |
| 2016/0303485 | A1 * | 10/2016 | Kawamura | B62D 6/003 |
| 2018/0304944 | A1 | 10/2018 | Wright | |
| 2018/0345952 | A1 * | 12/2018 | Layfield | B60L 15/20 |
| 2019/0161119 | A1 * | 5/2019 | Greenwood | G08G 1/00 |
| 2019/0217831 | A1 * | 7/2019 | Viele | B60D 1/245 |
| 2020/0001920 | A1 * | 1/2020 | Hejase | B60W 30/18036 |
| 2020/0010059 | A1 * | 1/2020 | Busse | B60T 8/321 |
| 2020/0130582 | A1 | 4/2020 | Wong et al. | |
| 2020/0180691 | A1 * | 6/2020 | Sandblom | B60W 30/18036 |
| 2020/0198423 | A1 | 6/2020 | Reed et al. | |
| 2020/0331547 | A1 | 10/2020 | Kowalchuk | |
| 2021/0080961 | A1 | 3/2021 | Shenai et al. | |
| 2021/0114597 | A1 * | 4/2021 | Tagesson | B60W 30/18036 |
| 2021/0159827 | A1 * | 5/2021 | Pramod | B62D 5/046 |
| 2021/0294333 | A1 * | 9/2021 | Jing | G05D 1/0276 |
| 2022/0017161 | A1 | 1/2022 | Layfield et al. | |
| 2022/0041069 | A1 * | 2/2022 | Layfield | B60L 7/10 |
| 2022/0161782 | A1 * | 5/2022 | Laine | B60W 50/0205 |
| 2022/0177033 | A1 * | 6/2022 | Laine | B60W 40/12 |
| 2022/0185048 | A1 * | 6/2022 | Yhr | G05D 1/0022 |
| 2022/0185329 | A1 * | 6/2022 | Deragarden | B60D 1/36 |
| 2022/0281464 | A1 * | 9/2022 | Sandblom | B60W 50/0097 |
| 2022/0355860 | A1 * | 11/2022 | Rydström | B62D 13/00 |
| 2022/0410990 | A1 | 12/2022 | Rust et al. | |
| 2023/0082801 | A1 * | 3/2023 | Laine | B62D 59/04 280/476.1 |
| 2023/0096655 | A1 * | 3/2023 | Persson | G06T 7/73 701/41 |
| 2023/0112013 | A1 * | 4/2023 | Laine | B60L 15/32 701/22 |
| 2023/0312029 | A1 * | 10/2023 | Layfield | B62D 53/005 180/6.5 |

OTHER PUBLICATIONS

Tong Wu, Solutions for Tractor-trailer Path following at Low Speed, Aug. 5, 2017, Auburn University, pp. 1-120 (Year: 2017).*

* cited by examiner

COMBINATION VEHICLE SYSTEM AND/OR METHOD

CROSS REFERENCE TO RELATED APPLICATIONS

This application claims the benefit of U.S. Provisional Application No. 63/392,332, filed 26 Jul. 2022, which is incorporated herein in its entirety by this reference.

This application is related to U.S. application Ser. No. 17/849,003, filed 24 Jun. 2022, which is incorporated herein in its entirety by this reference.

TECHNICAL FIELD

This invention relates generally to the vehicle controls field, and more specifically to a new and useful combination vehicle control system and/or method in the vehicle controls field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

The method S100 can include: determining a set of inputs S110; determining a vehicle state estimate S120; determining a vehicle command based on the vehicle state estimate S130; and optionally controlling the vehicle based on the vehicle command S140. However, the method S100 can additionally or alternatively include any other suitable elements. The method S100 functions to facilitate vehicle reversal and/or tractable vehicle control (e.g., during reversal). Additionally or alternatively, the method can function to reduce and/or eliminate unrecoverable vehicle state incidence during vehicle reversal (a.k.a., vehicle backing). Additionally or alternatively, the method can function to autonomously augment and/or assist vehicle control (e.g., during vehicle reversal).

Figure 2:
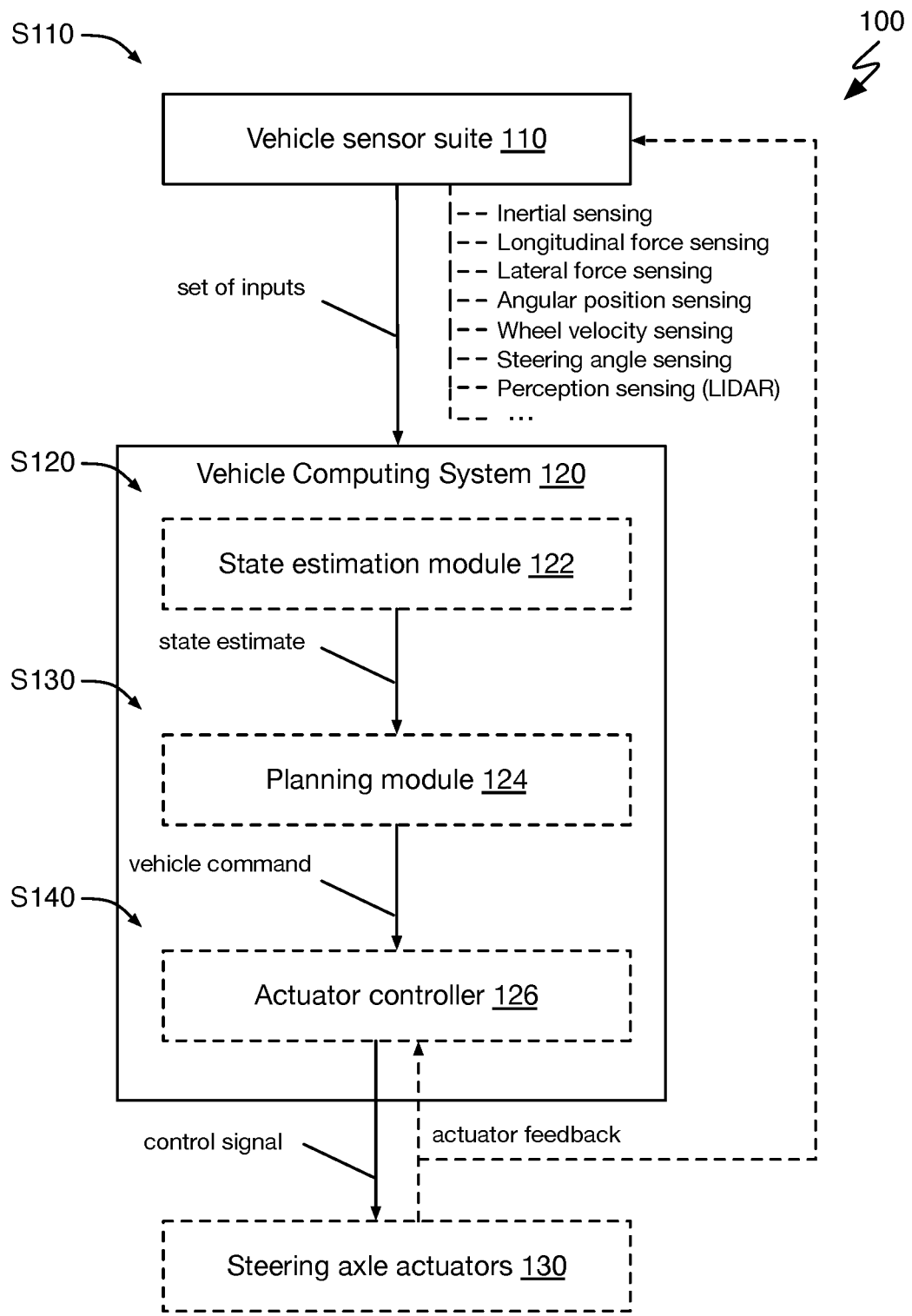
FIG. 2 is a schematic representation of a variant of the system.

The system 100, an example of which is shown in FIG. 2, can include: a vehicle sensor suite 110, a computing system 120, and an optional set of steering axle actuators 130. The computing system can include: a state estimation module 122, a planning module 124, and an actuator controller 126. However, the system 100 can additionally or alternatively include any other suitable set of components.

The system 100 and/or method can include and/or can be used in conjunction with the vehicle system(s) and/or methods as described in U.S. application Ser. No. 17/849,003, filed 24 Jun. 2022, which is incorporated herein in its entirety by this reference. In variants, the system 100 can include and/or can be used with a vehicle system 10 which includes a pair of vehicle couplings, each defining a respective pivot axis, and a secondary steering axle (e.g., such as a steerable drive axle). For example, the system can be used with a vehicle system which can operate as one vehicle in a combination vehicle (e.g., middle element of a long combination vehicle) and which functions to augment tractor propulsion and/or steering capabilities using a secondary electric drive axle(s) and/or the secondary steering axle (e.g., steerable drive axle; steerable drive axle with an integrated electric motor, etc.).

1.1 Variants

Figure 8:
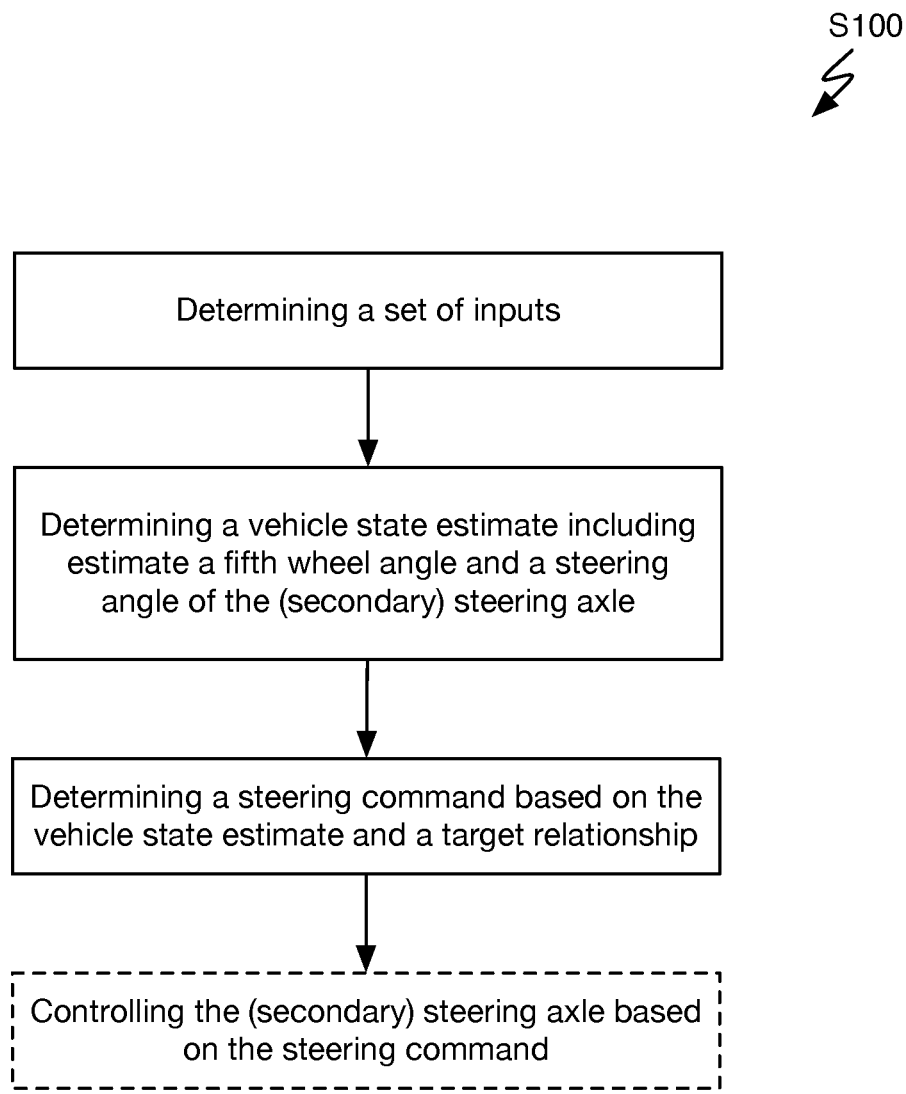
FIG. 8 is a flowchart diagram of a variant of the method.

In one set of variants (e.g., an example is shown in FIG. 8), a method for reversal of a multi-pivot, combination vehicle can include: collecting a set of inputs with a sensor suite of a vehicle system, the vehicle system comprising: a chassis, a steering axle mounted to the chassis, a kingpin configured to couple the chassis to a fifth wheel of the semi-tractor, and a secondary fifth wheel configured to couple the chassis to a trailer; at a computing system onboard the vehicle system, determining a vehicle state estimate based on the set of inputs, the vehicle state estimate comprising a fifth wheel angle and a steering angle of the steering axle; and based on the vehicle state estimate and a target relationship between the vehicle system and the semi-tractor (e.g., alignment of the chassis of the vehicle system and the tractor along a longitudinal axis), autonomously controlling the steering axle during reversal of the vehicle system to adjust the steering angle of the vehicle system.

In a second set of variants, nonexclusive with the first, a control system can detect the hitch angle (e.g., leading angle difference between the tractor and vehicle system 10) with a first sensor (e.g., Lidar) and use this angle as a feedback signal to actively command the steering angle (e.g., of the secondary steering axle) with a closed-loop controller, based on the kinematic relationship of the vehicle system, to regulate the hitch angle (e.g., target 0 degree angle; keep the chassis of the vehicle system aligned with the tractor). The kinematic relationship can be maintained in different both a (low-speed) forward and reverse direction of motion.

2. Benefits.

Variations of the technology can afford several benefits and/or advantages.

First, variations of this technology can facilitate reversal of a multi-pivot vehicle system using a secondary steering axle. As an example, multi-pivot vehicle systems having a short distance between pivots (e.g., shorter than a distance between the front steering axle on the tractor and a fifth wheel) may be highly sensitive to steering adjustments during reversal and may be difficult for a human driver to control while backing (e.g., particularly as the length of the entire vehicle system is large relative to the distance between pivots, such as when a 53' trailer is attached to the rear pivot, etc.; by steering only the front axle of the tractor). Variants can control the secondary steering axle (e.g., autonomously) to improve the stability of reversal control and/or reduce the sensitivity and/or complexity of driver adjustments during vehicle reversal. As a second example, variants can facilitate reversal of the vehicle system(s) as described in U.S. application Ser. No. 17/849,003, filed 24 Jun. 2022, which is incorporated herein in its entirety by this reference. However, variations of this technology can otherwise facilitate reversal of any suitable vehicle(s).

Second, variations of this technology can reduce the cognitive load on drivers when steering a multi-pivot vehicle system in reverse. For example, variants of the system and/or method can simplify the reversal control to mimic a vehicle behavior known to a driver (e.g., reversing a vehicle with no pivots, such as an unladen tractor; reversing a vehicle with a single pivot, such as a tractor-trailer combination, etc.) and/or a tractable behavior (e.g., smooth curve having a similar curvature to a tractor trailer combination, path with minimized sweep area, etc.). Variants can autonomously control the steering axle to minimize the area (i.e., sweep area) swept by the vehicle, trailer, and/or multi-pivot, combination vehicle during low-speed maneuvering (e.g., reversing and/or forward operation).

Figure 6:
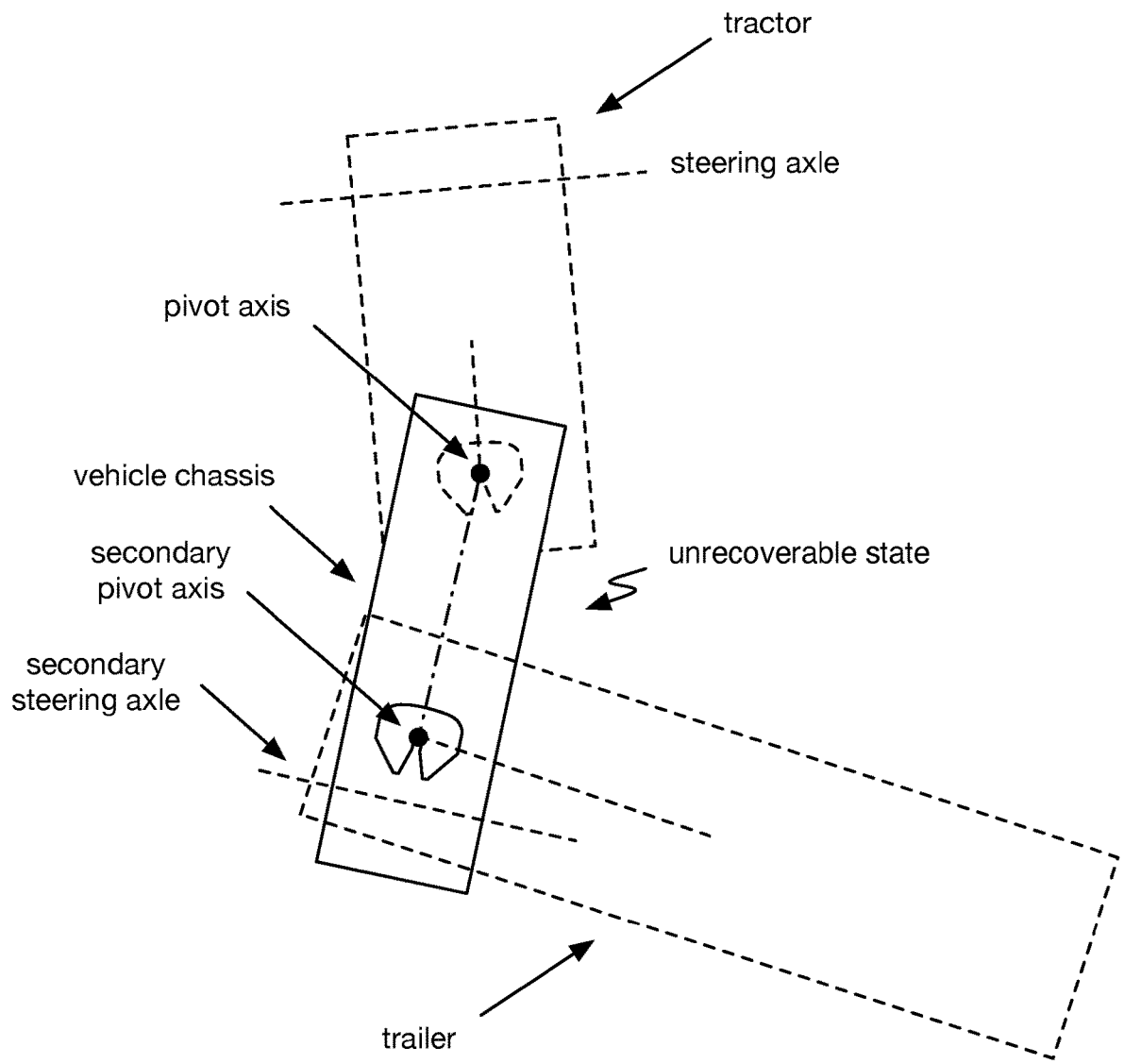
FIG. 6 is an example representation of an unrecoverable state in some variants of the system and/or method.

Third, variations of this technology can reduce or eliminate incidences of unrecoverable states (e.g., an example is shown in FIG. 6; jackknifing) during operation of a multi-pivot vehicle system, particularly when maneuvering in reverse (where the kinematic chain may be more sensitive to steering adjustments/errors). For example, variants can reduce jackknifing behavior while increasing lateral (trailer) maneuverability during vehicle reversal.

Fourth, variations of this technology can facilitate unified steering responses between forward operation and reversal control. For example, the effective kinematic behavior (and/or virtual kinematic system) can be substantially similar for all low-speed operation of the system (e.g., during both forward and reverse), which may yield more tractable maneuverability for a human driver. As an example, the multi-pivot, combination vehicle system may autonomously control a secondary steering axle to substantially minimize the sweep area during all low-speed operations (e.g., where dynamic effects are minimal, such as under 10 mph).

Fifth, variations of this technology can provide technical solutions necessarily rooted in computer technology (e.g., automatic data collection, utilizing computational models to characterize vehicle state and/or motion, autonomous steering) to overcome issues specifically arising with computer technology (e.g., issues surrounding how to leverage vehicle state data to improve vehicle reversal control and/or handling characteristics for multi-pivot combination vehicles). As an example, variations of this technology can utilize an autonomously steered axle to simplify the effective kinematic behavior of a long-combination vehicle.

However, variations of the technology can additionally or alternately provide any other suitable benefits and/or advantages.

3. System.

The system 100, an example of which is shown in FIG. 2, can include: a vehicle sensor suite 110, a computing system 120, and an optional set of steering axle actuators 130. The computing system can include: a state estimation module 122, a planning module 124, and an actuator controller 126. However, the system 100 can additionally or alternatively include any other suitable set of components.

The system 100 functions to facilitate execution of S100. Additionally or alternatively, the system can function to facilitate autonomous augmentation of propulsion and/or control of a tractor-trailer combination. Additionally or alternatively, the system can function to facilitate reversal of a vehicle system as described in U.S. application Ser. No. 17/849,003, filed 24 Jun. 2022, which is incorporated herein in its entirety by this reference.

The system 100 can include or operate in conjunction with a vehicle system 10 which may be integrated into a multi-pivot, combination vehicle system, and/or can be otherwise suitably implemented. For example, the system 100 can be implemented as an (autonomous) steering-assist system for a secondary steering axle of an intermediate vehicle within a combination roadway vehicle, which may aid steering of the combination roadway vehicle.

3.1 Vehicle

In variants, the system and/or method can include or operate in conjunction with a vehicle system 10 which includes: a set of vehicle couplings (e.g., defining a tractor interface, a trailer interface, etc.); a chassis; and a powertrain. The vehicle system functions to structurally support and/or tow a trailer—such as a Class 8 semi-trailer—and/or to augment/supplement a tractor propulsive capability (e.g., via a diesel/combustion engine) with a supplementary electric drive axle(s).

The vehicle system 10 is preferably a land vehicle and more preferably road vehicle (roadway vehicle), such as a combination roadway vehicle, but can additionally or alternatively be an off-road vehicle, rail vehicle, and/or any other suitable type of vehicle. Additionally or alternatively, the vehicle system can include or be used with a semi-truck (e.g., Class 8 tractor), a trailer, and/or any other suitable vehicle(s). In a first example, the vehicle system 10 is a roadway electric vehicle (EV) system configured to connect between a semi-tractor and a trailer. In a second example, the vehicle system 10 can be a steerable converter dolly. In a third example, the vehicle system 100 can be an autonomous EV (e.g., configured to independently maneuver, configured to autonomously control the electric powertrain and/or steering, etc.). In a fourth example, the vehicle system can include any of the vehicle system(s) as described in U.S. application Ser. No. 17/849,003, filed 24 Jun. 2022, which is incorporated herein in its entirety by this reference.

The set of vehicle couplings can function to couple, hitch, and/or connect the vehicle system to an adjacent vehicle, such as a tractor or trailer, along a respective mechanical interface. Additionally or alternatively, the set of vehicle couplings are preferably configured to transfer forces (e.g., longitudinal forces) between the vehicle system and the adjacent vehicle (e.g., tractor; trailer; etc.) to facilitate traversal.

The set of vehicle couplings can include: a fifth wheel (hitch), a kingpin, a trailer hitch, a pintle hitch coupling, a receiver hitch, a gooseneck hitch, a towing/trailing portion of one of the aforementioned couplings, and/or any other suitable set of vehicle coupling(s).

In one set of variants, the set of vehicle couplings can include and/or define a first mechanical interface at a leading end relative to a longitudinal axis of the vehicle which is configured to connect to a tractor (e.g., a.k.a., a tractor interface) and a second mechanical interface at a trailing end relative to a longitudinal axis of the vehicle which is configured to connect to a trailer (a.k.a., a trailer interface).

The tractor interface functions to mechanically connect the vehicle system to a tractor, such as a semi-tractor. The tractor interface is preferably configured to be hitched directly to a standard fifth wheel coupling of a tractor, however the tractor interface can additionally or alternatively be indirectly connected to the tractor—such as by way of an intervening instance of the vehicle system (e.g., chained together), intervening trailer, and/or any other suitable intervening hardware. The tractor interface is preferably rotatable (e.g., bolster-bowl in conjunction with a shear interface, kingpin), but can additionally or alternatively be fixed/rigid (e.g., constrained in six degrees freedom of rigid body motion). In a first example, the tractor interface is a kingpin. In a second example, the tractor interface can be configured to connect to a converter dolly.

In variants—such as when the vehicle system may be classified as a converter dolly—the tractor interface can include and/or be used with a drawbar (e.g., to meet regulatory/certification standards). In a first example, the front end of the chassis and a kingpin can be a drawbar. The drawbar can be configured to bear vertical loads (e.g., 10 k-40 k lbs, support a vertical load based on the mass of the trailer, etc.) and/or can be configured to transfer pitch moments between the tractor and the vehicle system. However, the drawbar can additionally or alternatively be (vertically) unloaded. However, the tractor interface and vehicle system can alternatively exclude a drawbar.

However, the system can include any other suitable tractor interface.

The trailer interface functions to mechanically connect the system to a trailer. The trailer interface includes a secondary fifth wheel (hereinafter interchangeable with 'sixth wheel'), which is configured to engage the kingpin of a trailer. The trailer interface and/or the engagement surface of the sixth wheel (e.g., upper surface) thereof is preferably arranged substantially in parallel with the tractor interface (e.g., upper engagement surface of the tractor fifth wheel and/or lower engagement surface of kingpin connection), however can additionally or alternatively be substantially planar with the tractor interface, within a predetermined height offset of the tractor interface (e.g., less than six inches), within a predetermined skew angle, and/or otherwise arranged relative to the tractor interface.

In a specific example, a first vehicle coupling defines an inferior contact surface (e.g., a trailer interface) and a horizontal reference plane six inches above the inferior contact surface and a second vehicle coupling (e.g., trailer interface) is mounted below the horizontal reference plane.

In a second example, a first (forward) vehicle coupling defines a first pivot axis at a forward end of the vehicle system, relative to a longitudinal axis of the vehicle system, and a second (rearward) vehicle coupling defines a second pivot axis at a rearward end of the vehicle system, relative to the longitudinal axis of the vehicle system.

However, the system can include any other suitable trailer interface.

The chassis functions to mount the battery pack and the powertrain (and/or steering axle thereof) and additionally or alternatively can function to transmit structural loads between any subset(s) of: the tractor interface, the trailer interface, and/or the wheels/powertrain. Additionally or alternatively, the chassis can mount/arrange the tractor interface and/or trailer interface at a first and second end of the vehicle system, respectively. The tractor interface is preferably mounted on an underside of the chassis and/or oriented downward (e.g., surface normal directed toward the ground). Likewise, the trailer interface is preferably mounted to a superior surface of the chassis and/or oriented upwards (e.g., surface normal directed away from the ground).

The structure of the chassis preferably sets a distance between the tractor interface and the trailer interface. The distance between the tractor and trailer interfaces is preferably fixed, but can additionally or alternatively be variable and/or adjustable (e.g., by shifting a mounting position of the trailer interface lengthwise along the chassis, such as to reduce an air gap between the tractor and trailer). The distance between the tractor and trailer interfaces can be: less than 50 cm, 50 cm, 100 cm, 150 cm, 200 cm, 250 cm, 300 cm, 400 cm, 500 cm, 550 cm, 850 cm, 855 cm, greater than 855 cm, less than 1 wheel diameter (e.g., relative to a wheel of the tractor and/or wheel mounted to the a drive axle of the vehicle system; 22.5 inches), 1 wheel diameter, 2 wheel diameters, 4 wheel diameters, 6 wheel diameters, 10 wheel diameters, greater than 10 wheel diameters, any range bounded by the aforementioned values and/or any other suitable distance. In a specific example, the distance between the tractor and the trailer interface can be predetermined based on a maximum distance between a rear axle and the fifth wheel coupling (at the tractor), but can be otherwise suitably determined.

In variants, the chassis can be configured to house the batteries (e.g., the chassis can include an integrated battery enclosure, at an interior) and/or the powertrain/suspension, or can be configured to mount the batteries and/or powertrain, such as at an exterior of the chassis.

However, the vehicle system can include any other suitable chassis.

The vehicle system can optionally include a battery pack, which functions to electrochemical energy in a rechargeable manner and/or functions to supply electrical energy to the powertrain (e.g., traction motor of an electric powertrain) and/or steering actuators. However, the vehicle system can include any other suitable power sources and/or can be otherwise actuated.

The vehicle system can include a powertrain, which functions to generate torque at the wheels. Additionally, the powertrain can be implemented with an automated and/or electronic steering system, with a set of steering actuators (e.g., at one or more axles), to facilitate autonomous/assistive steering. The powertrain can include: a traction motor, a transmission, a set of wheels. However, the vehicle system can include any other suitable powertrain. In a specific example, the vehicle system can include a steering drive axle with an integrated traction motor.

In variants, the vehicle system can include exactly one axle (e.g., which may advantageously reduce the overall length of the vehicle system and/or the cost of the vehicle system). Alternatively, the vehicle system can include multiple (e.g., two) axles, which can be of the same or different type (e.g., front driving, rear floating/driven). In variants, one or more axles can include an axle lift (e.g., a 'driving lift axle', a non-powered lift axle, etc.). In variants, one or more axles can be steerable and/or the vehicle can include axle actuation mechanisms. The axle is preferably a high-load axle, having an axle load capacity in excess of 17 k lbs. In a first variant, the axle is configured to support at least 24 k lbs. In a second variant, the axle is configured to support at least 30 k lbs. However, the axle can be otherwise configured and/or have any suitable axle load capacity (e.g., 17 k lbs, less than 17 k lbs, etc.). In a first example, the set of axles can include exactly one roadway axle (e.g., which can be a drive axle and/or steering axle). In a second example, the set of axles can include a plurality of roadway axles (e.g., two; a drive axle and a steering axle; etc.). In a third example, roadway axles in the first and second examples can operate in conjunction with a landing gear axle (e.g., in a low-speed setting, such as during yard operations; in an unhitched configuration). However, the vehicle can include any other suitable set of axles.

The vehicle system can include or be configured to operate with a single wheel on each end of an axle (e.g., 'super singles'), dual wheels (e.g., two per hub; 'dualies'), and/or there can be any other suitable wheel configuration(s). The wheels and/or tires are preferably sized to match the tractor and/or trailer wheels (e.g., 22.5"), but can alternatively be different (e.g., 19.5 inches, etc.). However, the powertrain can include (or be connected to) any suitable set(s) of wheels.

However, the system can include any other suitable powertrain and/or steering system(s).

The vehicle system can include a controller which functions to distribute power within the vehicle system, control the powertrain, and/or control steering actuation. The controller can additionally or alternatively function to implement autonomous vehicle controls (e.g., automatic regenerative braking) and/or assistive steering control. The controller can include a battery management system (BMS), motor controller (or motor inverter), and/or any other suitable components. The controller can be centralized (e.g., packaged within the chassis and/or mounted thereto; within a single module) or distributed (e.g., across multiple compute nodes, packaged within multiple compute modules, etc.).

The controller can include a battery management system which functions to monitor the battery state, which can include: state of charge (SoC), state of health (SoH), state of power (SoP), state of safety (SoS), temperature (e.g., of the battery or a set of cells therein, a temperature distribution of battery cells, etc.; cooling temperature), and/or any other suitable characteristics. The battery management system can also function to control the charging (e.g., via a charge port; during regenerative braking) and/or discharging (via the electric powertrain) of the battery. However, the controller can include any other suitable BMS.

The controller can include one or more motor controllers which function to condition power from the battery to be supplied to a traction motor and/or to control electrical propulsion and/or dynamic (regenerative) braking at the traction motor. There can be a single motor controller associated with the vehicle, one motor controller per motor, and/or any other suitable number of motor controllers. However, the controller can include any other suitable motor controllers.

However, the vehicle system can include any other suitable controller(s).

However, the system can include or operate in conjunction with any other suitable vehicle(s) and/or can provide autonomous steering functionality to any other suitable vehicle system(s). Alternatively, the system can be used entirely independently of a vehicle system 10 and/or can be otherwise configured.

3.2 Advanced Steering System(s)

Figure 7:
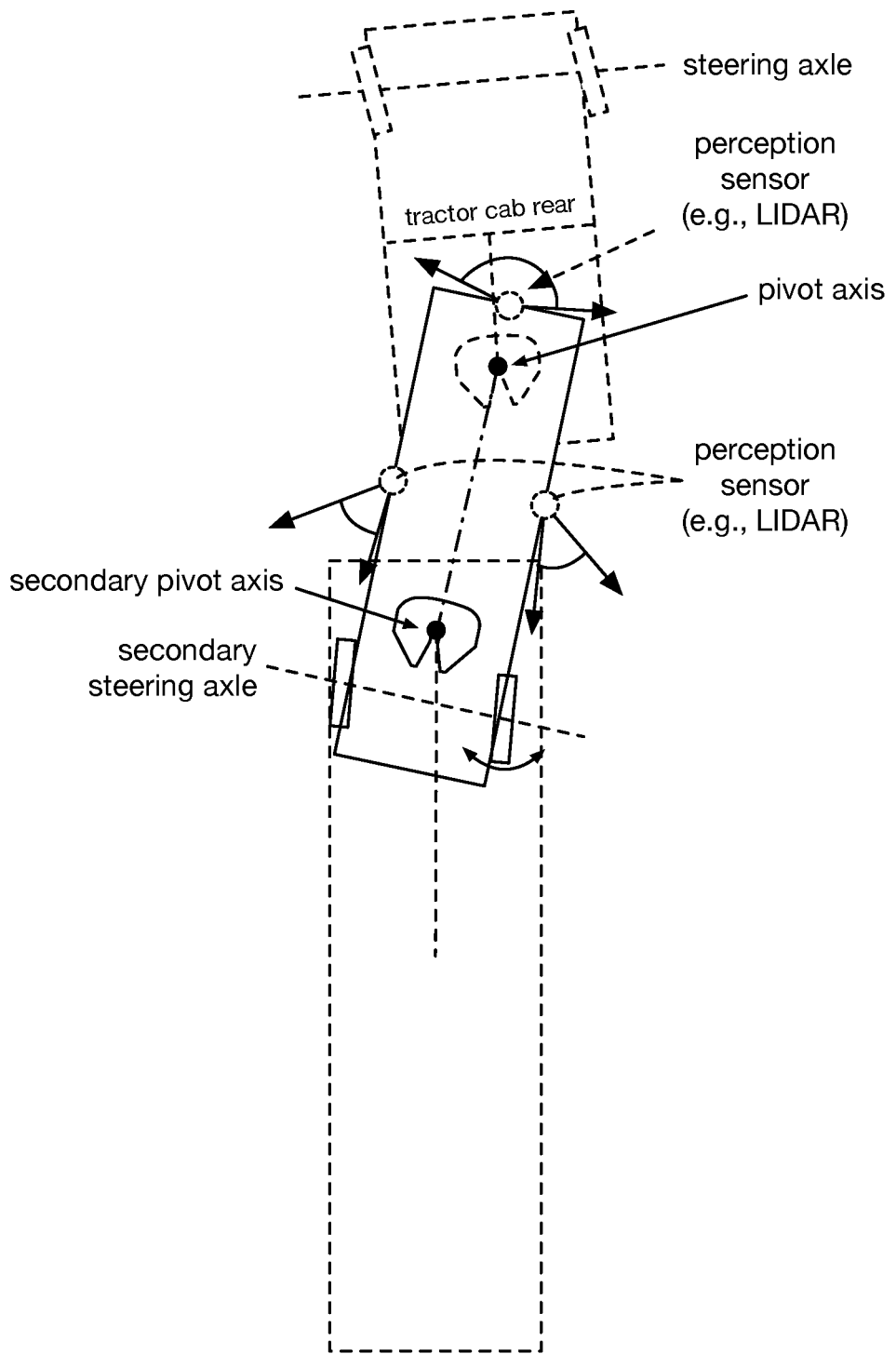
FIG. 7 is a diagrammatic representation of a variant of the system and/or method.

The vehicle sensor suite functions to monitor vehicle state parameters which can be used for vehicle control (e.g., autonomous steering control, etc.). The sensor suite can include one or more: vehicle coupling sensors (e.g., load cells, strain gages, angular position sensors, angular velocity sensors, etc.; lateral force sensors, longitudinal force sensors, vertical force sensors, angular position sensors, etc.), angular velocity sensors (e.g., Hall effect sensors, etc.), angular position sensors (e.g., absolute/incremental encoders, potentiometers, resolvers, etc.), internal sensors (e.g., force sensors, accelerometers, magnetometer, gyroscopes, IMU, INS, temperature, voltage/current sensors, etc.), wheel speed sensors (e.g., at a secondary steering axle, etc.), pivot angle sensors (e.g., at a fifth wheel or front vehicle coupling; at a secondary fifth wheel or rear vehicle coupling; perception sensors configured used to estimate pivot angle, etc.), axle-load sensors, diagnostic sensors (e.g., brake-line sensors, tractor/trailer inter-connection sensors or passthrough monitoring, etc.), location sensors (e.g., GPS, GNSS, triangulation, trilateration, etc.), perception sensors (e.g., LIDAR, Radar, cameras, etc.; forward and/or rearward facing, etc.; an example is shown in FIG. 7), cameras (e.g., CCD, CMOS, multispectral, visual range, hyperspectral, stereoscopic, etc.), range imaging sensors, LIDAR sensors, spatial sensors, touch sensors (e.g., resistive, capacitive, etc.), proximity sensors, time-of-flight sensors (e.g., Radar, LIDAR, etc.), ADAS sensors, and/or any other suitable sensors. However, the vehicle system can include any other suitable set of sensors.

In variants, sensors of the vehicle sensor suite can be integrated into a vehicle coupling, integrated into a steering axle (e.g., such as a steerable electric-drive axle, etc.), integrated to the vehicle (e.g., body/chassis, etc.), and/or otherwise integrated into the vehicle system 10. Sensors are preferably located onboard the vehicle and communicatively coupled to the vehicle computing system (e.g., a state estimation module thereof) by wired and/or wireless data connections. Additionally or alternatively, sensors can be located on a secondary vehicle (e.g., coupled to the vehicle about a pivot axis; tractor; trailer; coupled vehicle, etc.) and communicatively coupled to the vehicle computing system. However, the vehicle sensor suite can be otherwise implemented.

In a first set of variants, at least one sensor of the vehicle sensor suite can be integrated into a vehicle coupling (e.g., an angular position sensor) and configured to measure an angular position about a first/forward pivot axis. For example, a first sensor can directly measure a fifth wheel angle (e.g., angle between a longitudinal axis of the tractor and a longitudinal axis of the chassis; angle between the tractor and the trailer about the axis of rotation of the vehicle coupling).

In a second set of variants, nonexclusive with the first, the vehicle sensor suite can include a set of perception sensors (e.g., LIDAR) at a forward end of the vehicle system (e.g., vehicle coupling; fifth wheel coupling) configured to collect range data for points/pixels on the rear end of a leading vehicle (e.g., semi-tractor) of the combination vehicle. As an example, a 3D scanner (e.g., LIDAR sensor) can generate a point cloud model of a rear end of the semi-tractor, wherein the fifth wheel angle is estimated as a rotation of the point cloud model about the front pivot (e.g., axis of rotation of the fifth wheel coupling; central axis of the kingpin). In a first variant, the point cloud model can be used to estimate a plane (e.g., a rear plane of the semi-tractor cab; by any suitable plane fitting and/or estimation techniques, such as LSF, PCA, linear, non-linear, etc.), wherein the (yaw) angle of the plane relative to chassis (e.g., frontal plane) estimates the angular position of the vehicle coupling. However, the rear portion of various tractor cabs may include various asymmetries, angled bodies, and/or out-of-plane features (e.g., fuel tanks; air conditioning equipment; toolboxes; etc.), which may reduce the effectiveness of plane-fitting as an estimation tool. Accordingly, in a second alternative variant, pivot angle can be estimated as an error minimizing (yaw) rotation of a matched portion of the point cloud (e.g., corresponding to the rear portion of the tractor) about the central axis of the pivot (e.g., king pin central axis; axis of the vehicle coupling, such as a fifth wheel, etc.). For example, the rotation angle can be estimated relative to a prior (e.g., prior model/reference point cloud from a prior timestep, etc.; predetermined with the longitudinal axis of the tractor aligned with the longitudinal axis of the trailer).

In a third set of variants, nonexclusive with the first and second sets, the vehicle sensor suite can include a set of perception sensors to facilitate collision avoidance (e.g., during vehicle reversal) and/or ADAS technologies.

However, the vehicle system can include any other suitable sensor suite.

The computing system can function to execute any or all portions of the method S100. Additionally or alternatively, the computing system can function to determine vehicle commands based on sensor data from the vehicle sensor suite and facilitate control according to the vehicle commands (e.g., with the set of steering actuators). The computing system can include a plurality of data processing modules which can include: a state estimation module which functions to execute S120; a planning module which functions to execute S130; a controller which functions to execute S140; and/or any other suitable elements.

The computing system can include and/or can be integrated with the elements of the controller of the vehicle system (and/or may refer to a subset of the compute of the vehicle system 10), however the computing system can additionally or alternatively include separate processing from vehicle controls, and/or can be otherwise suitably implemented. The computing system is preferably local (onboard the vehicle system 10 and/or chassis thereof), but can additionally or alternatively include remote computing elements (e.g., at a processor onboard a tractor, remote/cloud compute, etc.). The computing system can be centralized, distributed, and/or otherwise suitably implemented.

However, the system can include any other suitable computing system.

The set of steering axle actuators (a.k.a., steering actuators) function to facilitate execution of Block S140 of the method and/or can function to steer the vehicle (e.g., and/or a trailer thereof, such as a trailer coupled to a rear vehicle coupling) based on the vehicle commands. In variants, the set of steering axle actuators are preferably integrated into a steerable electric drive axle (e.g., with an integrated electric powertrain) of the vehicle system 10, however the set of steerable axle actuators can alternatively include any suitable set of electric, pneumatic, hydraulic and/or other suitable actuators. The set of steering axle actuators are preferably integrated into and/or coupled to a secondary steering axle (e.g., rearward of a tractor; decoupled from a driver-controlled steering wheel of the vehicle; etc.), but can be otherwise implemented.

The set of steering axle actuators can be configured to transform the steering angle (i.e., the angle between the longitudinal axis and the steered wheel direction) of the steering axle through an actuation range, which can be the same or different from the steering angle range (i.e., maximum/minimum steering angle) of a lead tractor. For example, a semi-tractor may have a maximum (minimum) steering angle of about 20 degrees (−20 degrees) or more, whereas the actuation range of the steering axle and/or steering axle actuators maybe limited (e.g., based on the axle specifications; based on the practical constraints of a high-load, steering drive axle, for example). In variants, control of the set of steering axle actuators may be constrained by anti-windup logic (relative to the actuation range), which may prevent overshoot and/or oscillations resulting from control limit (which may otherwise result where the maximum steering angle of a lead vehicle exceeds the actuation limits of the steering axle and/or steering axle actuators, for example).

Physical actuation of the set of steering axle actuators may be limited to time periods wherein the vehicle is moving (i.e., wheels rotating), since dry steering the wheels (i.e., changing the steering angle while the vehicle is stationary) may exceed the available actuation force output of the steering actuator(s) (e.g., particularly for high-load axles, since the forces required to dry steer may scale with axle load). However, the steering axle actuators can be otherwise controlled/actuated in any vehicle operating modes/configurations with any other suitable timing.

In variants, the steering axle actuator(s) are preferably connected to and configured to be powered by an onboard power source (e.g., such as a battery pack onboard the chassis of the vehicle system 10). However, the steering axles can alternatively be otherwise powered and/or controlled.

However, the system 100 can include any other suitable set of steering (axle) actuator(s), and/or the steering actuators can be otherwise configured.

However, the system 100 can additionally or alternatively include any other suitable set of components.

4. Method.

Figure 1:
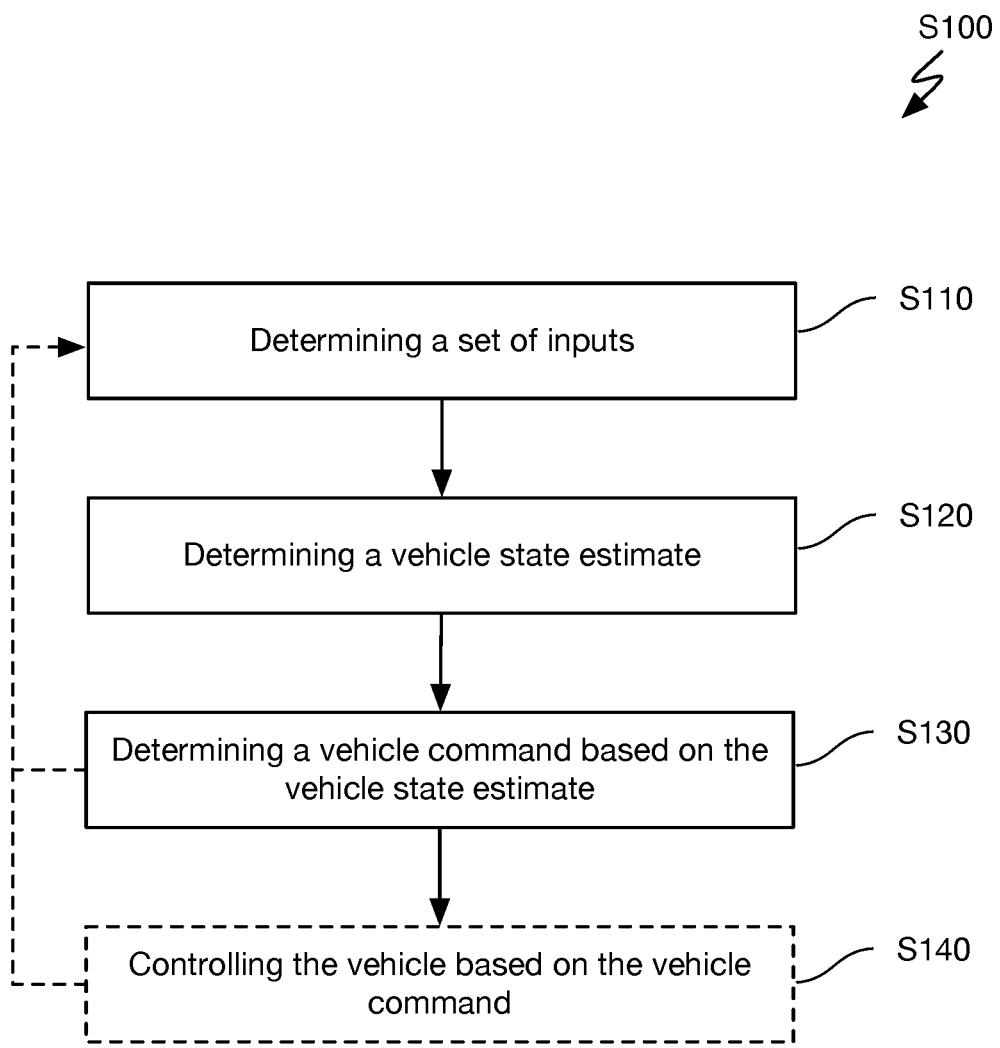
FIG. 1 is a diagrammatic representation of a variant of the method.

The method S100, an example of which is shown in FIG. 1, can include: determining a set of inputs S110; determining a vehicle state estimate S120; determining a vehicle command based on the vehicle state estimate S130; and optionally controlling the vehicle based on the vehicle command S140. However, the method S100 can additionally or alternatively include any other suitable elements.

The method S100 functions to facilitate vehicle reversal and/or tractable vehicle control (e.g., during reversal, during low-speed operation, etc.). Additionally or alternatively, the method can function to reduce and/or eliminate unrecoverable vehicle state incidence during vehicle reversal (a.k.a., vehicle backing). Additionally or alternatively, the method can function to autonomously augment and/or assist vehicle control (e.g., during vehicle reversal).

The method and/or individual elements thereof can be executed: once, iteratively, repeatedly, periodically, aperiodically, continuously (e.g., over a finite interval; during vehicle operation; during vehicle reversal; etc.), in response to an event trigger (e.g., a vehicle motion; a determination that the vehicle is moving in reverse, etc.), and/or with any other suitable timing. The method sub-elements are preferably performed serially/sequentially for each iteration of the method, but additionally or alternatively can be performed contemporaneously, synchronously, asynchronously, repeatedly, and/or with any other suitable timing or relationship (e.g., for one or more iterations of the method, etc.).

Determining a set of inputs S110 functions to determine inputs to be used for vehicle state estimation (e.g., Block S120), planning (e.g., Block S130) and/or control (e.g., Block S140). The set of inputs preferably include measurements collected with sensors of the vehicle sensor suite, but can additionally or alternatively include: a set of prior vehicle state estimate (e.g., from a previous iteration(s) of the method S100 and/or Block S120 thereof; prior vehicle state estimate parameters), a prior vehicle command/action (e.g., from a previous iteration of the method S100 and/or Block S130 thereof), a set of driver commands (e.g., received wired/wirelessly from a tractor; a brake command received via a pneumatic brake line; a steering input associated with a steering wheel; etc.), and/or any other suitable inputs. For example, inputs can be collected and/or received from sensors of the vehicle sensor suite during S110.

The set of inputs can include measurements of: a steering angle (e.g., associated with a secondary steering axle, such as a steerable electric drive axle); a set of vehicle coupling parameters (e.g., angular position, longitudinal force, etc.) associated with each of a plurality of vehicle couplings; wheel (angular) velocity; vehicle motion parameters (e.g., position-velocity-acceleration [PVA] data, inertial data, etc.), perception inputs (e.g., LIDAR data, camera images, etc.; point cloud model of a rear end of the tractor, etc.), and/or any other suitable inputs.

As an example, the set of inputs can include a first angular position measurement (e.g., absolute angle relative to the longitudinal axis of the vehicle, relative position, etc.) of a first vehicle coupling (e.g., fifth wheel coupling) about a first pivot axis and a second angular position measurement (e.g., absolute angle relative to the longitudinal axis of the vehicle, relative position, etc.) of the second vehicle coupling (e.g., secondary fifth wheel coupling) about a second pivot axis.

As a second example, the set of inputs can include a point cloud (e.g., generated by a 3D scanner, perception sensor, LIDAR, depth imaging sensor, etc.) corresponding to an adjacent vehicle/body of the combination vehicle (e.g., semi-tractor; trailer; etc.).

The inputs are preferably determined periodically (e.g., more than once per second; with a frequency of about 5-30 Hz) to facilitate command/control of the system in (substantially) real-time during operation of the system, but can be determined with any other suitable frequency, timing, and/or (individual) update interval(s).

However, any other suitable set of inputs can be determined in S110.

Figure 3A:
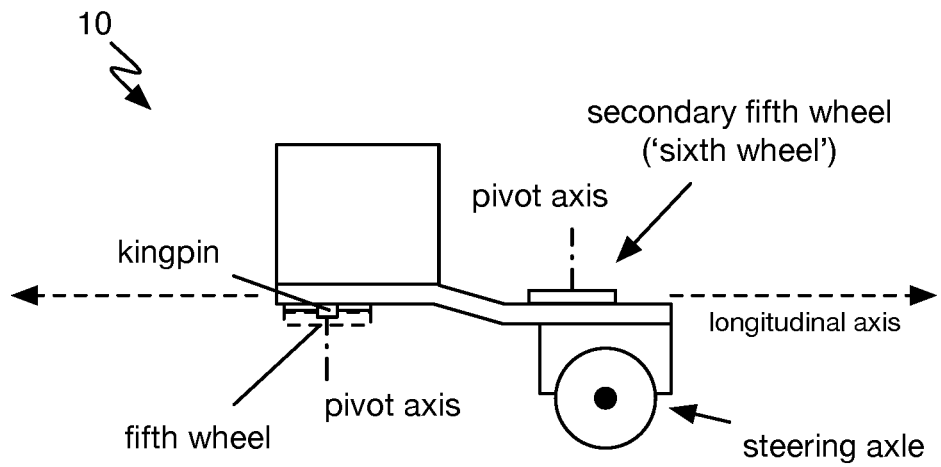
FIG. 3A is a schematic example of a variant of the system.
Figure 3B:
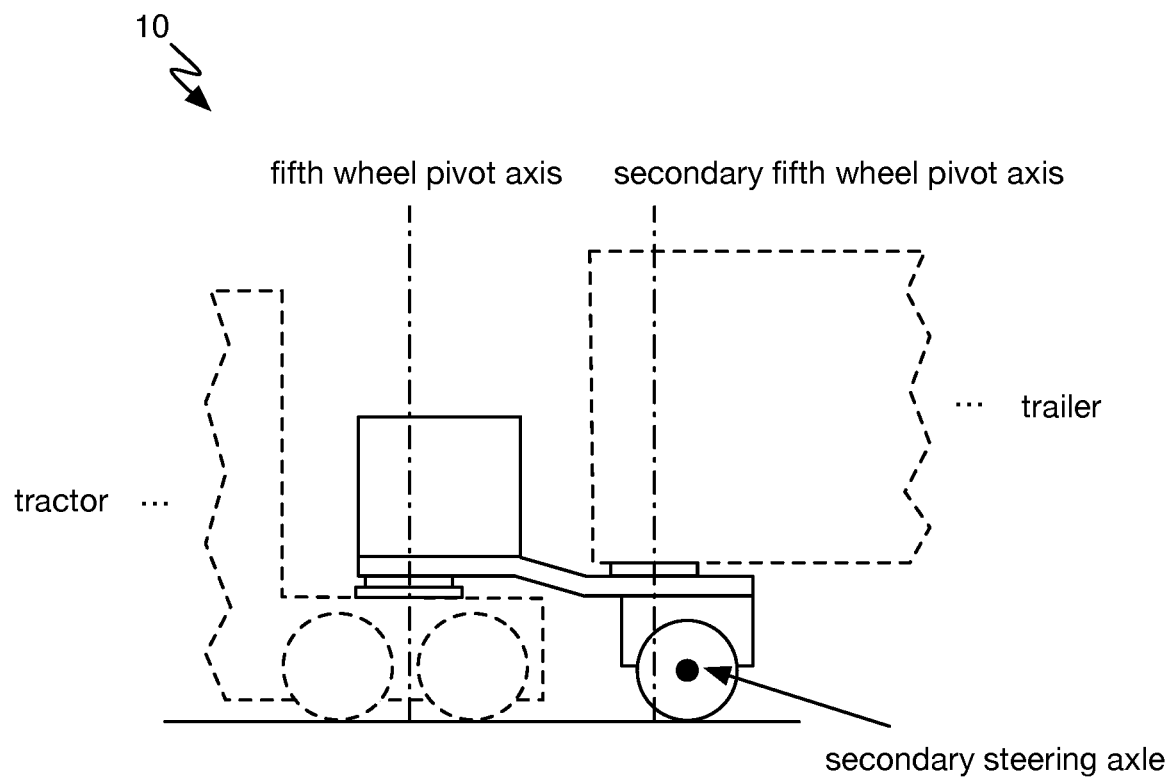
FIG. 3B is a schematic example of a variant of the system.

Determining a vehicle state estimate S120 functions to estimate the vehicle state, which can be used for planning (e.g., command generation) and/or control. Additionally or alternatively, S120 can function to estimate a vehicle configuration (e.g., trailer connected) and/or operating mode (e.g., forward operation; reversal operation; etc.). The vehicle state can be estimated for a plurality of connected vehicles of a combination vehicle (e.g., a tractor, a trailer, and a vehicle system 10 coupling the tractor and the trailer, etc.; a long-combination vehicle, etc.) or a subset thereof (e.g., vehicle system 10, vehicle system 10 along with a tractor, etc.). In a first example, the vehicle state can be estimated for a vehicle defining a first and second pivot axis at a first and second vehicle coupling, respectively (e.g., a first example is shown in FIG. 3A; a second example is shown in FIG. 3B). In a second example, a vehicle state can be estimated for each vehicle of a long-combination vehicle (e.g., including at least three vehicle bodies, including multiple pivots, etc.; an example is shown in FIG. 3B).

The vehicle state can include an instantaneous estimate of vehicle state parameters at a single point in time (e.g., current time and/or current sampling interval) and/or a vehicle trajectory of vehicle state parameters as a function of time (e.g., vehicle state parameter prediction(s) based on a kinematic model for the vehicle.; predicted angular velocity/acceleration of a coupling about a pivot axis; etc.). The vehicle state estimate can include: a classification of a vehicle operating mode (e.g., forward operation, reversal operation, driving, stationary, etc.); a classification of a vehicle configuration (e.g., front and rear couplings engaged in a long-combination configuration, front coupling engaged and rear coupling disengaged in a trailer configuration, rear coupling engaged and landing gear deployed in a yard-jockeying configuration, etc.); pose parameters; motion parameters; primary steering angle (e.g., front steering angle; at front steering axle of a semi-tractor), secondary steering angle (e.g., steering angle at the steering axle), pivot angles (e.g., connected vehicles of a combination vehicle), and/or any other suitable vehicle state parameters.

The vehicle state is preferably determined by fusing the plurality of inputs (e.g., based on the kinematic model for the vehicle) into a unified state estimate, but vehicle state parameters can be directly measured/estimated by the inputs determined during S110, and/or can be otherwise suitably determined. The vehicle state is preferably determined and/or updated periodically (e.g., with substantially the same update frequency as the inputs; 5-30 Hz; etc.), but can be determined with any other suitable frequency/timing.

The vehicle state preferably includes an estimated (angular) position of at least one vehicle coupling of the multi-pivot combination vehicle. For example, the vehicle state estimate can include a pivot angle of the fifth wheel coupling (e.g., angle between the longitudinal axis of the tractor and the longitudinal axis of the vehicle system 10 and/or chassis thereof). The pivot angles (departures from alignment) about each pivot axis can be estimated using perception tracking, fused sensor inputs (e.g., force data, inertial data, etc.), and/or any other suitable inputs.

In one set of variants, a pivot angle can be estimated as a rotation (e.g., error minimizing rotation, mean rotation, best-fit plane, etc.) of a point cloud model (e.g., determined with a 3D scanner, such as a LIDAR sensor) about the front pivot axis (e.g., axis of rotation of the fifth wheel coupling; central axis of the kingpin; the axis of rotation can be predefined relative to the coordinate frame of the system and/or sensor(s), simplifying the computation, since the relative motion is kinematically constrained by the pivot). The pivot angle can be estimated in relative terms (e.g., based on a comparison to a prior state with an arbitrary angular rotation; which can be used to estimate angular velocity, etc.) and/or in absolute terms (e.g., comparison relative to a fixed reference state, such as with the vehicle system and tractor in alignment along a longitudinal axis; predetermined in association with the target relationship; etc.). Additionally or alternatively, the pivot angle can be estimated by feature matching (e.g., CV and/or point cloud features), edge detection, plane estimation, direct ranging, and/or any other suitable perception based estimation technique(s).

In a specific example, the fifth wheel angle can be estimated as a rotation of a point cloud model about a central axis of the kingpin relative to a reference (e.g., wherein the target relationship is associated with a minimization of a rotation error of the point cloud model relative to the reference).

However, the pivot angle(s) can be otherwise determined.

The vehicle state can optionally include an estimated pose and/or steering angle of a front steering axle (e.g., which can be driver controlled; relative to the longitudinal axis and/or coordinate frame of a connected vehicle). In some variants, the steering angle of the front steering axle may not be directly measurable or observable from the inputs from S110. In such variants, the instantaneous pose and/or front steering angle can be estimated based on the vehicle state history and/or historical measurements, such as by using a vehicle model (e.g., kinematic model; predetermined model, etc.; based on predetermined and/or estimated tractor characteristics; with forward kinematics; etc.). Additionally or alternatively, the pose of a tractor and/or a front steering angle thereof can be directly received from the tractor (e.g., steering angle pulled from the tractor CAN bus, received from a processing system onboard the tractor, etc.), estimated entirely independently of semi-tractor steering command signals and/or a semi-tractor CAN bus, or neglected entirely from the vehicle state estimate (e.g., where the steering commands are derived from the relationship at the fifth wheel coupling).

In some variants, the vehicle state can optionally include an environmental representation including obstacles (e.g., in an ego-vehicle coordinate frame) identified by an autonomous perception system based on the set of inputs, which can be used for collision avoidance and/or automatic braking control in S130. Alternatively, the vehicle state estimate can exclude an environmental representation and/or include only intrinsic parameter estimates.

The vehicle state is preferably estimated with a state estimation module of a vehicle computing system (e.g., an autonomous computing system onboard the vehicle system), but can be determined at any other suitable endpoint(s).

However, the vehicle state can be otherwise determined.

Determining a vehicle command based on the vehicle state estimate S130 functions to determine a vehicle command to achieve a predetermined behavior of the (long combination and/or multi-pivot) vehicle. Additionally or alternatively, S130 can function to determine vehicle commands which avoid entering an unrecoverable vehicle state (and/or maintain a tractable/controllable vehicle state) during vehicle reversal. Additionally or alternatively, S130 can function to autonomously determine assistive steering and/or assistive braking commands.

Figure 4A:
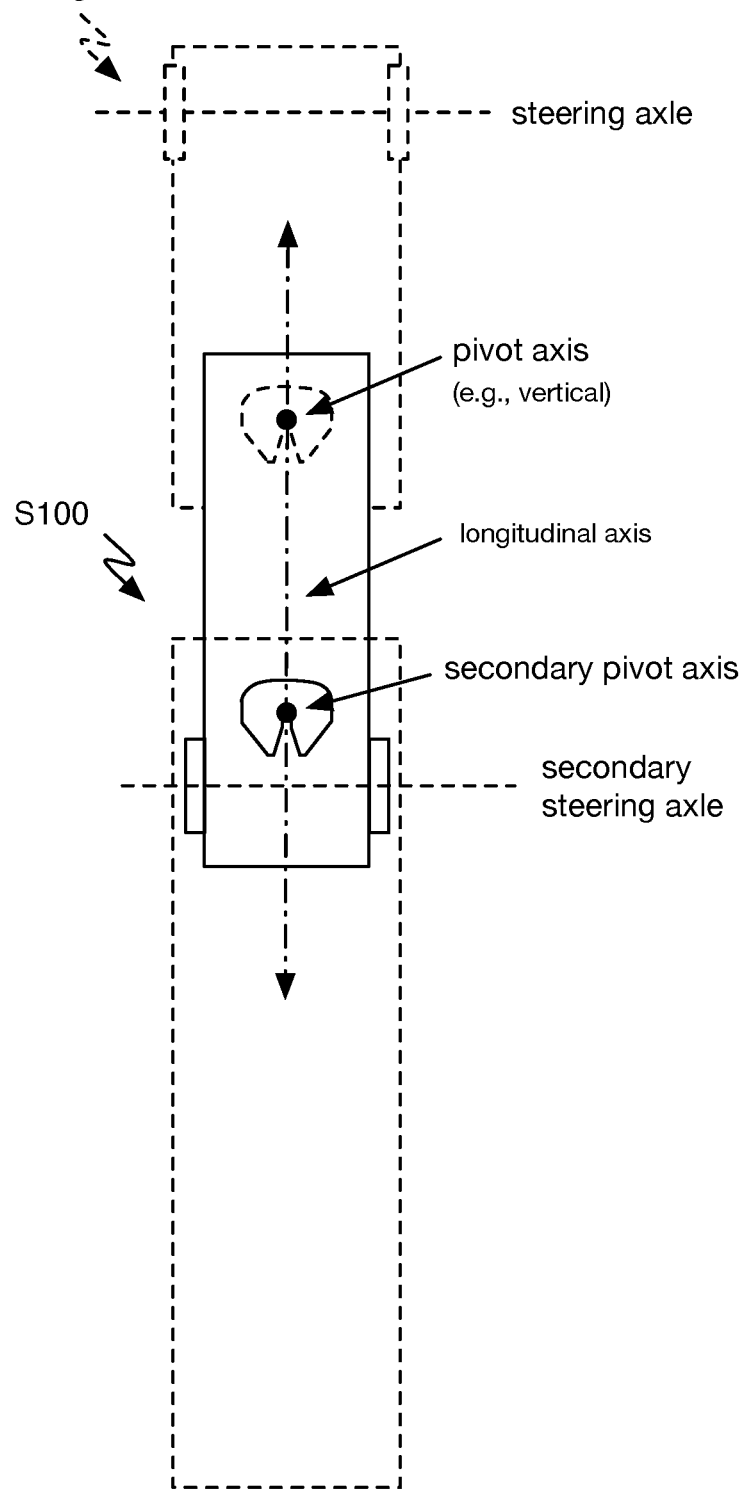
FIG. 4A is a diagrammatic representation of a variant of the system and/or method.

In variants, the S130 determines commands to achieve the predetermined behavior based on a target relationship. The target relationship is preferably a relationship between vehicle bodies (e.g., a kinematic relationship associated with a predetermined effective kinematic behavior), but can additionally or alternatively be a trajectory relationship, a relationship between the vehicle and the environment (e.g., or an object in an environmental representation), and/or any other suitable relationship. The target relationship can be an effective kinematic behavior of the vehicle system, an effective kinematic constraint, a target trajectory/path relationship, a target kinematic relationship, an environment and/or any other suitable target relationship. Additionally or alternatively, the target relationship can be an effective kinematic relationship between a (front) steering axle, a pivot angle about a pivot axis, a secondary pivot angle about a secondary pivot axis, and a secondary steering axle (an example is shown in FIG. 4A).

The target relationship is preferably predetermined for a vehicle operating mode (e.g., reversal; low-speed operation, such as below a threshold speed of 5 mph, 10 mph 15 mph, etc.), but can additionally be dynamically determined (e.g., based on a vehicle speed and/or environmental representation), and/or otherwise suitably determined.

Figure 4B:
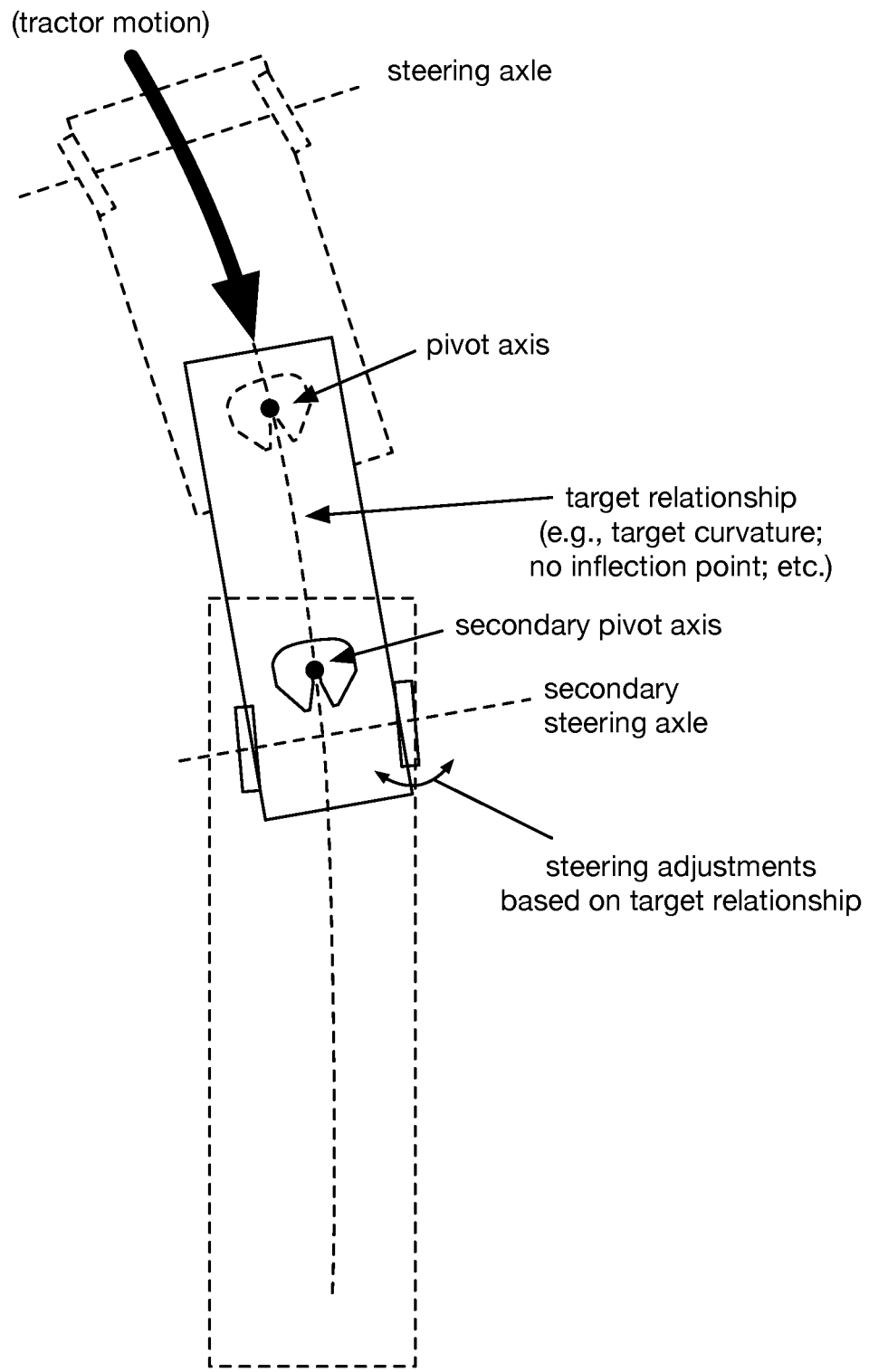
FIG. 4B is a diagrammatic representation of a variant of the system and/or method.

In a first variant, an example of which is shown in FIG. 4B, the target relationship can be a trajectory relationship and/or a target relationship between a path/motion of the vehicle and a leading vehicle body. For example, the commands can be generated to target a sane/tractable trajectory curvature, such as a smooth curve, an arc with unidirectional curvature (e.g., without inflection points), a polynomial curve (e.g., second order polynomial, high order polynomial, etc.), and/or any other suitable arcuate path. The target trajectory can be determined according to a predetermined lookup table (e.g., for various vehicle state parameters and/or vehicle configurations), dynamically determined as a function of the vehicle state estimate for a particular vehicle state and/or vehicle configuration, and/or can be otherwise suitably determined.

Figure 4C:
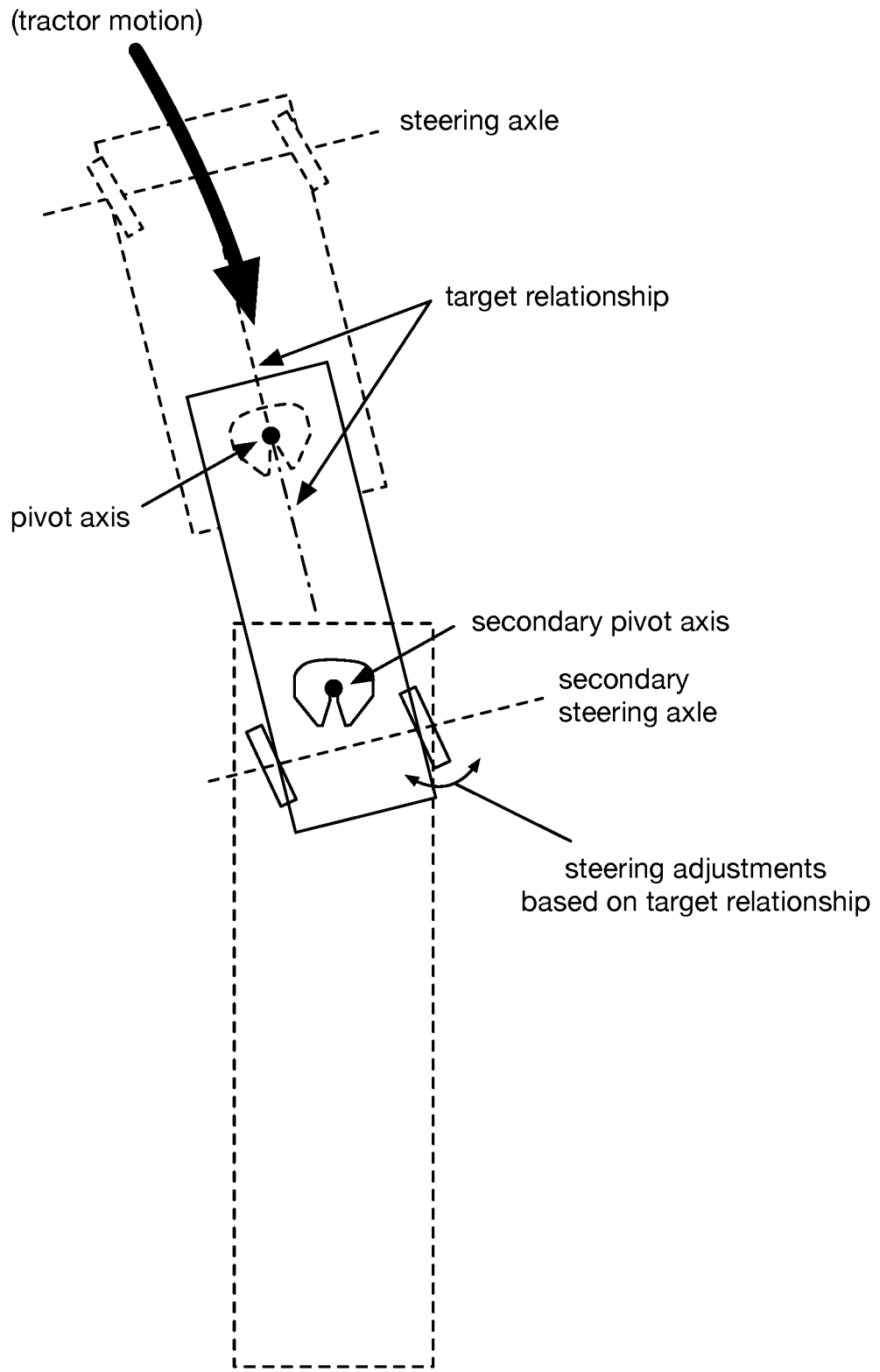
FIG. 4C is a diagrammatic representation of a variant of the system and/or method.

In a second variant, an example of which is shown in FIG. 4C, the target relationship can be a virtual kinematic relationship between the vehicle and a leading vehicle body (e.g., a tractor), effectively fixing an angle at a front pivot axis (e.g., aligning a longitudinal axis of the vehicle with a longitudinal axis of a tractor; pivot axis of the fifth wheel coupling)—where vehicle commands are generated to minimize rotational (and/or angular velocity) errors about the front pivot axis.

Figure 4D:
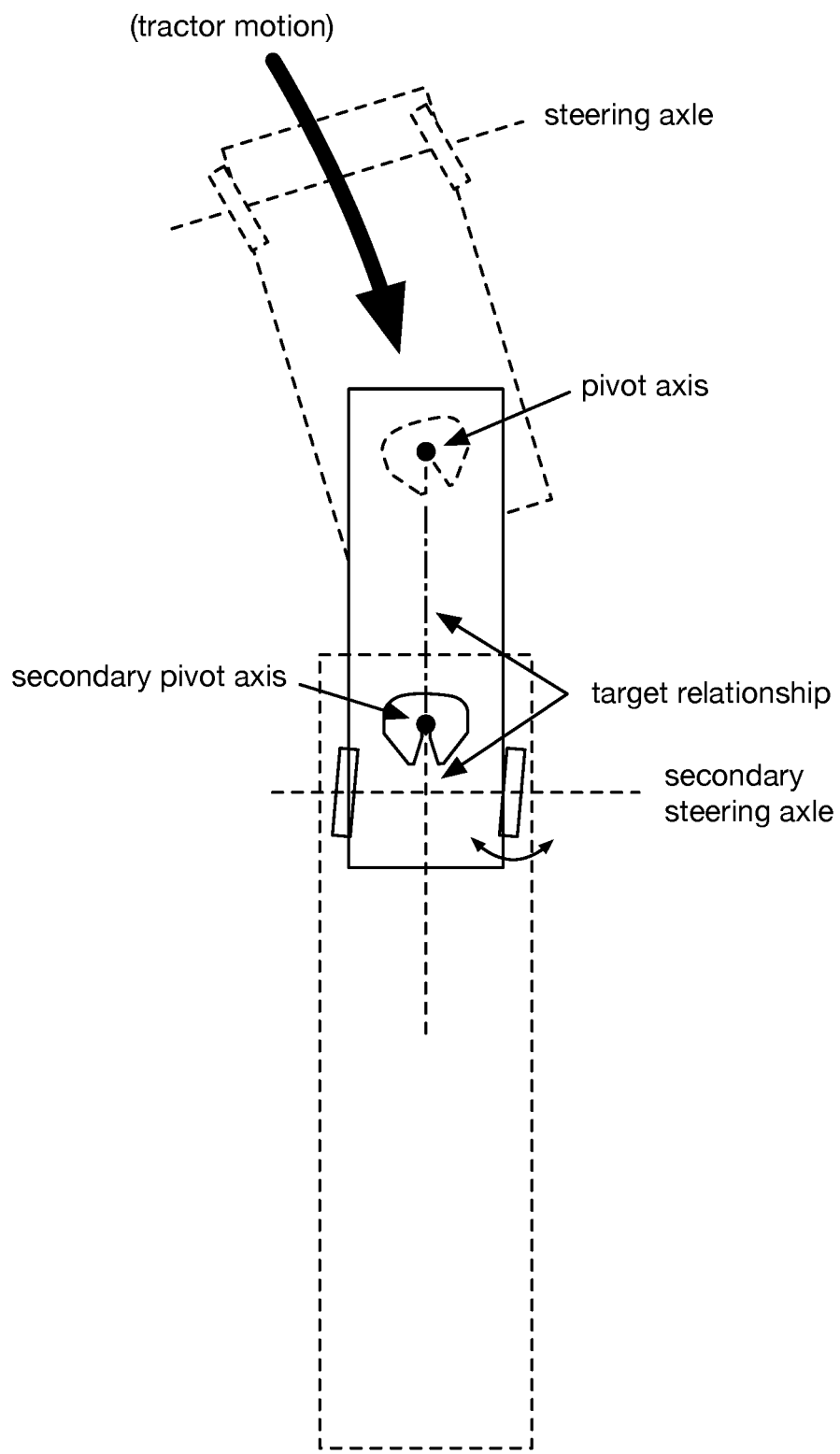
FIG. 4D is a diagrammatic representation of a variant of the system and/or method.

In a third variant, an example of which is shown in FIG. 4D, the target relationship can be a virtual kinematic relationship between the vehicle and a trailing vehicle body (e.g., a trailer), effectively fixing an angle at a rear/secondary pivot axis (e.g., aligning a longitudinal axis of the vehicle with a longitudinal axis of a trailer)—where vehicle commands are generated to minimize rotational (and/or angular velocity) errors about a rear/secondary pivot axis.

Figure 5:
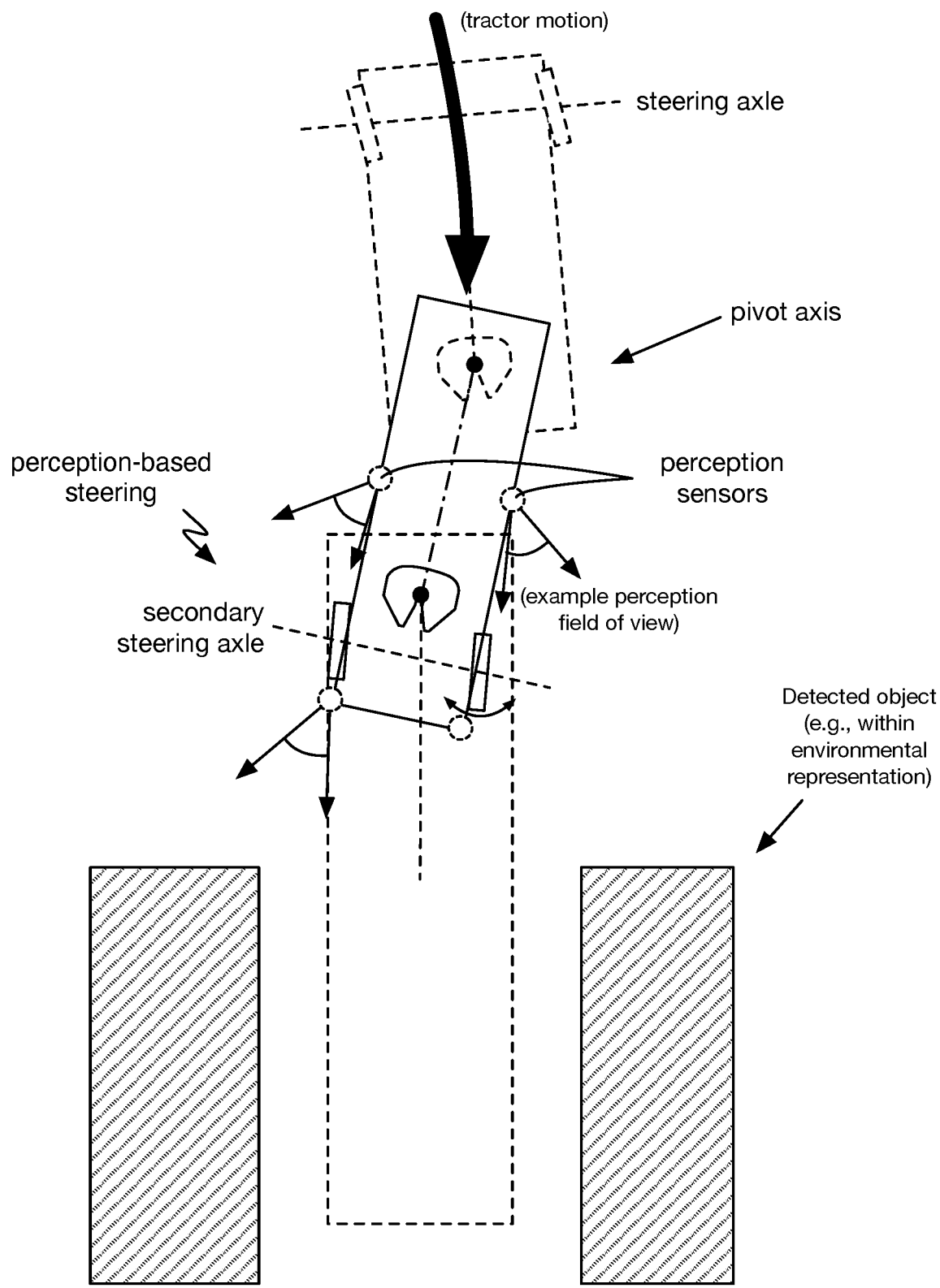
FIG. 5 is a diagrammatic representation of a variant of the system and/or method.

In a fourth variant, the target relationship can be between the vehicle (and/or connected vehicle bodies in a combination vehicle) and the vehicle environment (e.g., an example is shown in FIG. 5).

In a fifth variant, the target relationship can minimize a cost function associated with a sweep area of the combination vehicle.

However, there can be any other suitable target relationship and/or commands can be determined based on any suitable target behavior.

In variants, commands may be based on a determination that the vehicle is moving in reverse and/or operating in a reversal mode, and/or may only adjust the steering angle during periods of vehicle motion (e.g., to avoid dry steering of the secondary axle; to avoid excess tire wear, particularly for tires on high load axles and/or secondary axles). Accordingly, in some variants, S130 may limit steering commands to periods of vehicle reversal and/or during which the wheels of the secondary steering axle are rotating, which can reduce tire wear. Conversely, in some variants, S130 may not command steering changes while the vehicle is stationary (e.g., to avoid dry steering).

The commands generated in S130 are preferably determined based on the target relationship for the vehicle model (e.g., of the combination vehicle). The vehicle model can be a predetermined vehicle model, a dynamic model (e.g., a kinematic vehicle model which includes parameters which are updated based on vehicle dynamics, such as during roadway driving and/or reversal operations), and/or any other suitable vehicle model. In a specific example, the vehicle model comprises a kinematic model with parameters estimated based on historical behavior of the system (e.g., during forward driving, etc.). For example, the vehicle configuration parameters which are intrinsic to a particular configuration of the vehicle system (e.g., such as the total vehicle mass, distance between a driver-controlled steering axle and a pivot axis, a trailer length, and/or any other suitable configuration parameters) can be estimated and/or inferred to refine vehicle model for a particular configuration and/or improve resulting vehicle behavior.

In variants, the vehicle model can relate physical relationships between vehicle state parameter estimates, which can include: a pose of each body of the combination vehicle, a front (driver-controlled) steering axle, a pivot angle about a pivot axis (e.g., at a fifth wheel coupling), a secondary pivot angle about a secondary pivot axis (e.g., at a secondary fifth wheel coupling; a.k.a., sixth wheel), a secondary steering axle, and/or any other suitable vehicle state parameter estimates; an example vehicle model is shown in FIG. 4A.

The commands preferably include steering commands (e.g., steering angle adjustments) for a secondary steering axle of the vehicle; however, commands can additionally or alternatively include commands associated with any other suitable control degrees of freedom, such as actuation about a pivot axis, brake actuation, and/or propulsive actuation. Steering commands can be determined based on the vehicle model and the target relationship using any suitable mapping, relationship, and/or control scheme. For example, the commands can be generated using inverse kinematics, feedforward controls (e.g., linear, non-linear, etc.), feedback controls (e.g., linear, non-linear, etc.), and/or any other suitable control scheme to generate commands.

In one set of variants, the commanded steering angle can be determined using a linear controller (e.g., PI controller, PID controller, etc.; with anti-windup schemes based on the steering angle limits), which minimizes error relative to the target relationship (e.g., angle at the front pivot).

Additionally or alternatively, in some variants, steering commands may be limited based on steering envelope protections (e.g., constraints on kinematic branches), which restrict steering commands/adjustments based on a steering envelope in which all states may allow a driver to recover from driver steering errors by further reversal. For example, steering envelope protections may avoid entering unrecoverable states (e.g., an example is shown in FIG. 6), in which reversal further exacerbates driver errors and/or a misalignment between vehicles at the first and/or second pivot axle, independently of driver-controlled steering adjustments. In a second example, steering envelope protections may avoid situations where a driver preferentially elects to exit a reversing mode (e.g., by driving forwards) in order to improve control authority over the vehicle. Steering envelope protections can include: absolute steering angle limits, measurement-relative steering angle limits (e.g., based on instantaneous sensor measurements; based on pivot angles at the vehicle coupling; etc.), dynamic steering limits (e.g., based on vehicle state, reversal speed, estimated front steering angle, etc.), model-based limits (e.g., based on a kinematic model of the combination vehicle), and/or any other suitable envelope protections. In an illustrative example, steering envelope protections may resemble flight envelope protections, which prevent the pilot of an aircraft from making control commands that would force the aircraft to exceed its structural and aerodynamic operating limits, but are instead imposed for autonomous steering based on kinematic operating limitations (e.g., rather than structural or aerodynamic limitations). In variants, steering envelope protections can include or be used in conjunction with anti-windup schemes (e.g., for a linear controller, to avoid controller overshoot and/or exceeding envelope boundaries where the steering commands are constrained by the actuation range of steering actuators; based on kinematic branch constraints of the kinematic vehicle model).

Additionally or alternatively, commands can additionally or alternatively include autonomous brake commands, which can be employed based on steering envelope protections (e.g., to avoid unrecoverable states; at a steering envelope boundary and/or a braking threshold) and/or collision constraints (e.g., based on environmental representation; to avoid self-collision based on the kinematic vehicle model; ADAS; environmental collision constraints; etc.).

Additionally or alternatively, in some variants, commands generated in S130 may additionally augment propulsive forces using a powertrain and/or drive axle (e.g., where the secondary axle is a steering drive axle) based on the force at the fifth wheel coupling. Alternatively, the commands may be limited to steering commands associated with a secondary steering axle (e.g., steering axle of an intermediate vehicle of a combination vehicle with a plurality of pivots).

Commands are preferably determined with a planning module of a vehicle computing system (e.g., an autonomous computing system onboard the vehicle), but can be determined at any other suitable endpoint(s). The planning module can be: a kinematic planner, a path planner, a learned neural network (e.g., learned from manual driver manipulations), a model-based controller (e.g., PI controller; linear, kinematic controller; etc.), and/or be any other module of the computing system. For instance, commands can be determined with a model-based control scheme in conjunction with any suitable decision trees, rules/heuristics, cost-function optimization, error minimization, and/or control logic/constraints.

In variants, the control scheme is preferably unified between forward and reverse operation (e.g., based on the same target relationship and/or kinematic vehicle model), but can alternatively be different (e.g., where a dedicated control scheme may be relied upon to reduce control sensitivity/complexity during reverse operation, which may not be well suited to nominal operation/driving, particularly at high speeds; a first unified, dynamic control scheme may be relied upon for nominal forward operation, which may be distinct from the reversal controls). For example, the steering axle can be autonomously controlled with a unified control scheme for both forward and reverse operation (e.g., in a low-speed operation mode; below 30 mph, below 20 mph, below 10 mph, below 5 mph, etc.).

However, commands can be otherwise suitably generated.

Optionally controlling the vehicle based on the vehicle command S140 functions to affect the motion of the vehicle based on the command. Additionally or alternatively, S140 can function to facilitate reversal by (autonomously) steering a secondary axle of vehicle based on the command.

S140 preferably includes controlling steering actuation of a secondary steering axle based on the vehicle command, but can additionally include brake actuation and/or secondary powertrain actuation based on the vehicle command. The secondary steering axle can be actuated: electrically (e.g., electromechanical actuation; with a motor linear actuation, etc.), pneumatically, hydraulically, and/or otherwise suitably actuated. The vehicle command can be executed within any suitable actuator control scheme(s), such as: open-loop control, feedforward control, feedback control, linear control, non-linear control, vector control (FOC/VFD), and/or any other suitable actuator control scheme(s). However, the vehicle can be otherwise suitably controlled.

The steering actuation is preferably (autonomously) controlled with a controller of an autonomous computing system (e.g., an autonomous computing system onboard the vehicle system), but can be performed with any other suitable components and/or at any other suitable endpoint(s).

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for reversal of a multi-pivot, combination vehicle comprising:
   collecting a set of inputs with a sensor suite of a vehicle system, the vehicle system comprising: a chassis, a steering axle mounted to the chassis, a kingpin configured to couple the chassis to a fifth wheel of a semi-tractor, and a secondary fifth wheel configured to couple the chassis to a trailer;
   at a computing system onboard the vehicle system, determining a vehicle state estimate based on the set of inputs, the vehicle state estimate comprising a fifth wheel angle and a steering angle of the steering axle; and
   based on the vehicle state estimate and a target relationship between the vehicle system and the semi-tractor, autonomously controlling the steering axle during reversal of the vehicle system to adjust the steering angle of the vehicle system, wherein the steering axle control scheme is unified between forward and reverse operation.

2. The method of claim 1, wherein a distance between the kingpin and an axis of the secondary fifth wheel is less than 550 centimeters.

3. The method of claim 1, wherein autonomous control of the steering axle is based on a set of environmental collision constraints.

4. The method of claim 1, wherein autonomous control of the steering axle comprises a set of model-based envelope protections.

5. The method of claim 4, wherein the model-based envelope protections comprise an anti-windup scheme based on a set of kinematic branch constraints.

6. The method of claim 1, wherein the sensor suite comprises a 3D scanner, wherein the set of inputs comprises a point cloud model of a rear end of the semi-tractor determined using the 3D scanner, wherein the fifth wheel angle is estimated as a rotation of the point cloud model about a central axis of the kingpin relative to a reference.

7. The method of claim 6, wherein the 3D scanner comprises a LIDAR sensor.

8. The method of claim 6, wherein the target relationship is associated with a minimization of a rotation error of the point cloud model relative to the reference.

9. The method of claim 1, wherein the steering angle is autonomously controlled using a linear controller which minimizes error relative to the target relationship.

10. The method of claim 1, wherein the target relationship is an alignment of the chassis and the semi-tractor along a longitudinal axis.

11. The method of claim 1, wherein the target relationship is a minimized cost function associated with an area swept by the multi-pivot, combination vehicle during reversal of the vehicle system.

12. The method of claim 1, wherein the vehicle system comprises a battery electric powertrain.

13. A vehicle system comprising:
   a chassis;
   a sensor suite;
   a kingpin configured to couple the chassis to a fifth wheel of a semi-tractor;
   a secondary fifth wheel configured to couple the chassis to a trailer;
   a steering axle mounted to the chassis; and
   a computing system communicatively coupled to the sensor suite, the computing system configured to:
      determine a vehicle state estimate based on inputs from the sensor suite; and
      based on the vehicle state estimate, autonomously control the steering axle based on a kinematic vehicle model to achieve a target relationship between the semi-tractor and the chassis,
   wherein, in a low-speed operating mode, the steering axle is autonomously controlled with a unified control scheme for both forward and reverse operation.

14. The system of claim 13, wherein the target relationship is a virtual kinematic relationship with the semi-tractor and chassis in alignment along a longitudinal axis.

15. The system of claim 13, wherein the target relationship is a minimized rotation error of a rear end of the semi-tractor about an axis of the kingpin.

16. The system of claim 13, wherein the steering axle comprises at least one steering actuator which is connected to a power source onboard the chassis of the vehicle system.

17. The system of claim 13, wherein the computing system is configured to operate independently of semi-tractor steering command signals and a semi-tractor CAN bus.

18. The system of claim 13, wherein the chassis is a converter dolly chassis.

* * * * *